United States Patent [19]

Risley

[11] 3,995,735
[45] Dec. 7, 1976

[54] CONVEYOR SYSTEM
[75] Inventor: Robert F. Risley, Wauwatosa, Wis.
[73] Assignee: Jos. Schlitz Brewing Company, Milwaukee, Wis.
[22] Filed: Sept. 3, 1974
[21] Appl. No.: 502,760
[52] U.S. Cl. .............................. 198/425; 198/572
[51] Int. Cl.² .................. B65G 47/26; B65G 43/08
[58] Field of Search ................. 198/19, 34, 37, 40, 198/76, 102, 105, 110, 127 R, 232

[56] References Cited
UNITED STATES PATENTS

| | | | |
|---|---|---|---|
| 2,801,725 | 8/1957 | Sindzinski et al. | 198/34 |
| 2,878,919 | 3/1959 | Jones | 198/34 |
| 3,155,221 | 11/1964 | Griner | 198/34 |
| 3,175,674 | 3/1965 | Howard | 198/34 |
| 3,178,006 | 4/1965 | Nigrelli et al. | 198/34 |
| 3,217,859 | 11/1965 | Bartlo et al. | 198/34 |
| 3,251,452 | 5/1966 | Conway et al. | 198/34 |
| 3,424,293 | 1/1969 | Deutschlander | 198/34 |
| R25,215 | 8/1962 | James | 198/232 |

FOREIGN PATENTS OR APPLICATIONS 1,034,055  6/1966  United Kingdom ................. 198/34

*Primary Examiner*—Johnny D. Cherry
*Assistant Examiner*—Jeffrey V. Nase
*Attorney, Agent, or Firm*—Andrus, Sceales, Starke & Sawall

[57] ABSTRACT

The disclosed conveyor system provides for a more organized and orderly flow of articles between a pair of spaced stations. The system generally comprises spaced infeed and discharge portions with an intermediate travel portion. Signal means provide for the formation of a train or slug of the articles on the infeed portion and thereafter their delivery downstream. Generally the articles within a slug are spaced from each other as they move downstream so that the system provides for a minimum of contact and pressure between the articles. The system provides for maximum accumulation so that production at the infeed station may continue up to a given period of time even while the discharge station is experiencing down-time. The one or more belt conveyors of the intermediate portion of the conveyor system are driven and controlled by an hydraulic system that automatically senses the need to stop for purposes of accumulation and when operation is again to be resumed.

11 Claims, 7 Drawing Figures

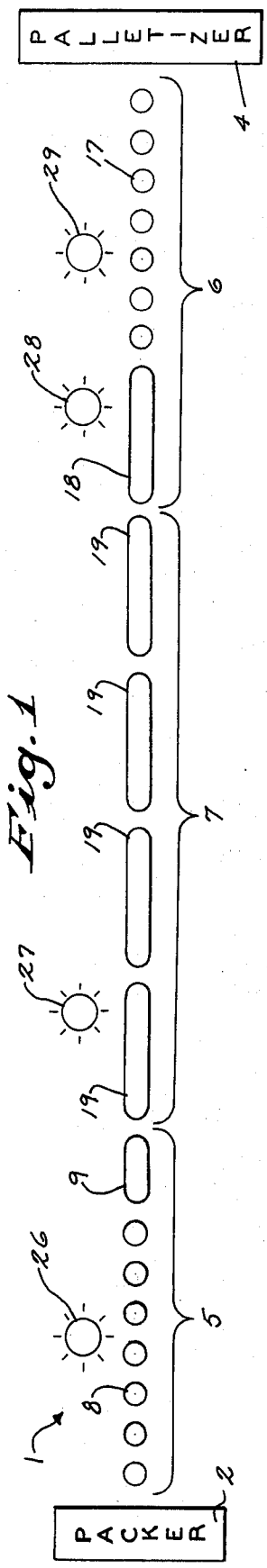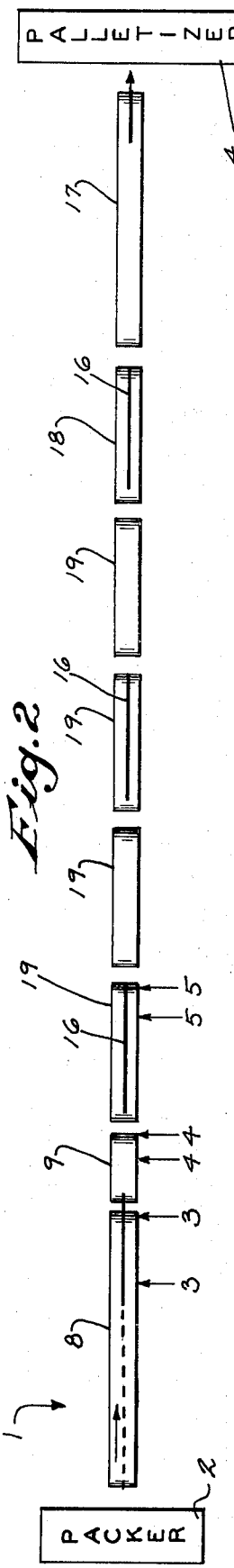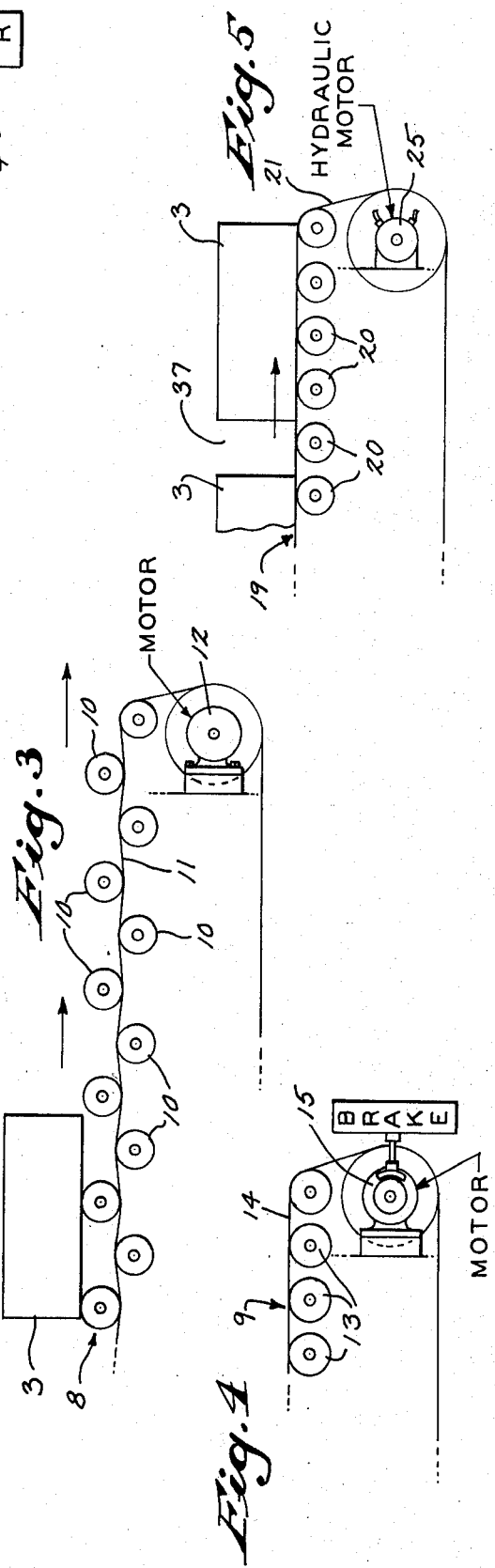

CONVEYOR SYSTEM

Background of the Invention

This invention relates to a conveyor system for transporting articles in trains or slugs between a pair of spaced stations.

Bottles, jars, cans and other container forms containing food, beverage and a variety of other products are customarily packed in boxes, cartons or cases by packing machines and then conveyed to a location remote from the packing machine for palletizing in preparation for shipment or storage. Conveyor systems disposed between the packer and palletizer are frequently quite long to provide for accumulation of cases on the system making it possible for the packer to continue production even while the palletizer may be momentarily shut down. Such conveyor systems generally comprise a wide variety of roller and belt conveyors or combinations thereof arranged in series. In the known conveyor systems there is little or no real control over the individually dispatched cases which experience considerable and sometimes severe jostling and bumping and pressure as they ride the system. The potential for damage to the cases and/or their contents imposes rather severe operating speed limitations on the conveyor system.

It is generally an object of this invention to provide a conveyor system which provides for a more organized and orderly flow of articles between a pair of spaced stations. The system is characterized by a minimum of contact and pressure between the articles and maximum accumulation with provision for relatively rapid recovery.

SUMMARY OF THE INVENTION

Generally the conveyor system of this invention contemplates the conveyance of articles in trains or slugs from an infeed station to a discharge station. The infeed portion of the conveyor system includes a brake belt conveyor at the downstream end thereof to provide for the formation of the slugs on the infeed portion and the delivery of the slugs for conveyance downstream to the discharge station. Means are provided upsteam from the brake belt conveyor to signal the formation of a full slug on the infeed portion. Means are provided downstream from the brake belt conveyor to signal the capability for receiving a newly formed slug. The upsteam and downstream signal means together serve to control the stop-go operation of the brake belt conveyor.

According to a further aspect of the invention, it is contemplated that the portions of the conveyor system downstream from the brake belt conveyor will operate at a speed faster than the brake belt conveyor speed. As a result of this speed differential, a space or gap is provided between the individual articles in the slug upon delivery and the gap is generally maintained during conveyance downstream until the slug reaches the discharge station.

A still further aspect of the invention contemplates that the conveyor system will provide for maximum accumulation so that production at the infeed station may continue even while the discharge station is experiencing up to a given period of downtime. In the discharge portion of the conveyor system a second brake belt conveyor is disposed upstream from the discharge conveyor. Means are provided to signal the inability for the discharge conveyor to receive the next full slug of cases. Means are also provided to signal the approach of the next full slug on the second brake belt conveyor. The signal means indicating the inability for the discharge conveyor to receive the next full slug of cases and the approach of a slug on the second brake belt conveyor together serve to effect a stoppage of the brake belt conveyor and thus start the process of accumulation on the conveyor system.

Another aspect of the invention provides for the intermediate portion of the conveyor system between the infeed portion and discharge portion to include at least one hydraulically driven belt conveyor. The hydraulic motor for driving the belt of the conveyor is controlled by pressure responsive flow control valving providing for motor torque generally proportional to the momentary demand of the corresponding belt. The valving senses a friction force imposed on the belt when the lead case of a slug thereon halts its progress upon contacting the already stopped belt of the next immediate downstream conveyor to thereby automatically stop the hydraulically driven belt conveyor and accumulate the slug resting thereon. When the next immediate downstream conveyor resumes operation, the friction force is removed from the belt of the hydraulically driven conveyor so that it automatically resumes operation.

DESCRIPTION OF THE DRAWING FIGURES

The drawings furnished herewith illustrate the best mode presently contemplated for carrying out the invention and are described hereinafter.

In the drawings:

FIG. 1 is a diagrammatic side elevational view of the conveyor system of this invention and generally shows the conveyor elements along with the relative positions of the signal means for controlling the operation thereof;

FIG. 2 is a diagrammatic plan view of the conveyor system and in heavy solid lines generally shows the relative positions of several trains or slugs of articles thereon at a given instant during normal operation of the system;

FIG. 3 is a diagrammatic side elevation taken generally on line 3—3 of FIG. 2;

FIG. 4 is a diagrammatic side elevation taken generally on line 4—4 of FIG. 2;

FIG. 5 is a diagrammatic side elevation taken generally on line 5—5 of FIG. 2;

DESCRIPTION OF THE ILLUSTRATED EMBODIMENT

Figure 7:
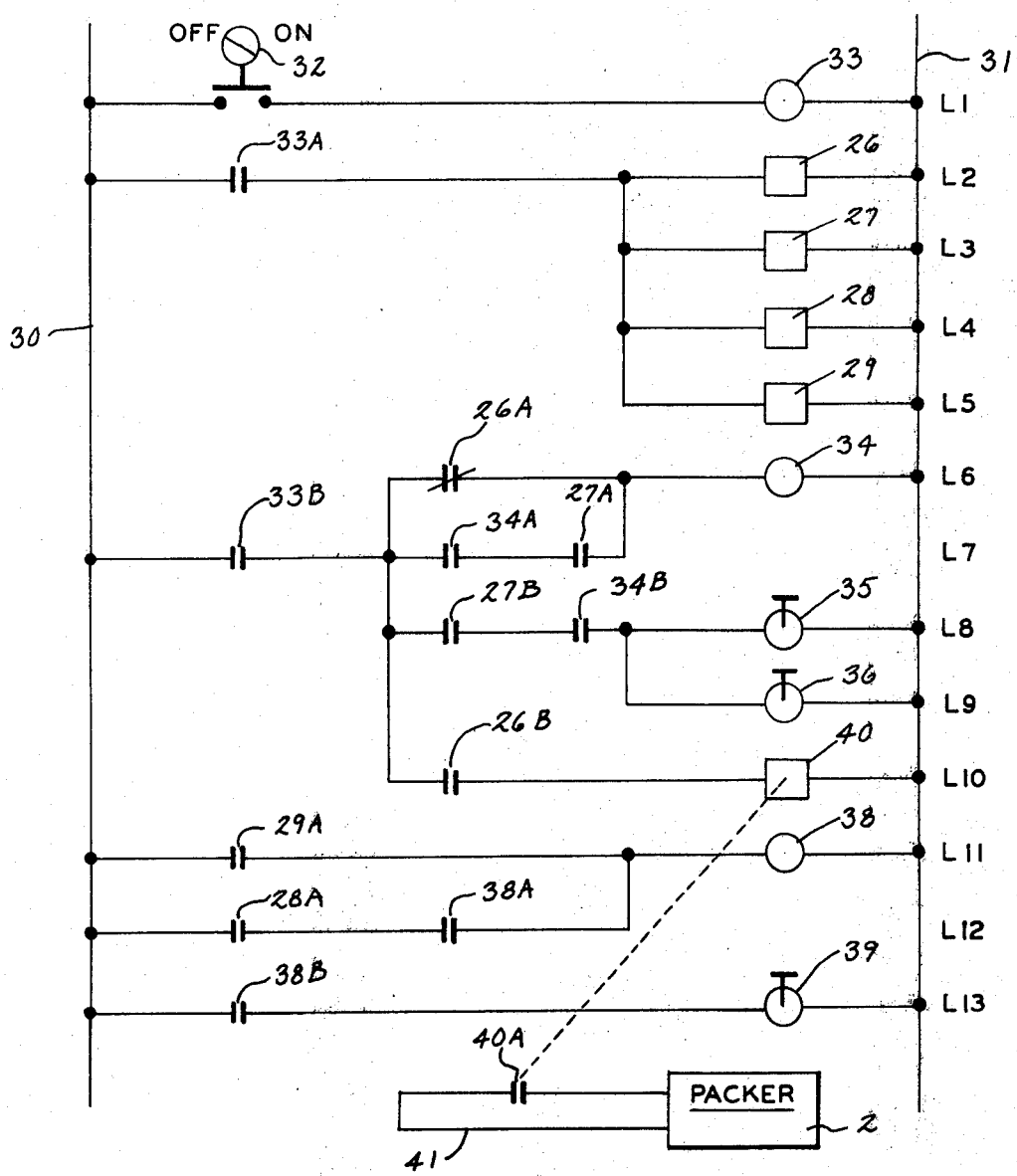
FIG. 7 is an electrical diagram showing the electrical control system for the conveyor system of this invention.

Referring to the drawings, the conveyor system 1 of this invention is shown as being employed between a pair of spaced stations. The stations are exemplified herein as a packing machine 2, wherein the product is packed in boxes, cartons, or cases 3 and delivered to the conveyor system 1, and a palletizing machine 4, wherein the boxes, cartons or cases are removed from the conveyor system and arranged on a pallet, not shown, for shipping or storage.

The conveyor system 1 generally comprises an infeed portion 5 adjacent to the packing machine or packer 2, a discharge portion 6 adjacent to the palletizing machine or palletizer 4, and an intermediate travel portion 7 between the infeed and discharge portions.

The infeed portion 5 of conveyor system 1 generally includes a section of conveyor that will expeditiously carry off the production of packer 2, such as the live roller conveyor 8, followed by a brake belt conveyor 9.

As generally shown in FIG. 3, the live roller conveyor 8 generally comprises a pair of vertically spaced, superposed layers of transversely extending, longitudinally spaced rollers 10. The upper reach of a continuous belt 11 is supported by the lower layer of rollers 10 in a manner to effect driving contact with the rollers 10 of the upper layer to positively move downstream the cases 3 deposited on the conveyor 8 by the packer 2. A suitable motor 12 drives the belt 11 continuously during the production period, or at least continuously during periods of operation of the packer 2 so as not to impede production from the packer. The motor 12 is a 2-speed motor capable of driving the belt 11 and hence upper rollers 10 at a given speed under one set of conditions and at a faster speed under another set of conditions for reasons which will become known hereinafter.

The brake belt conveyor 9 immediately downstream from the conveyor 8 generally comprises a single layer of longitudinally spaced, transversely extending supporting rollers 13. As generally shown in FIG. 4, the rollers 13 of conveyor 9 support the upper reach of the continuous belt 14 along with any load carried directly on the belt. A motor-brake combination 15 drives the belt 14 and provides for relatively rapid start up and stop operation for the belt. The brake belt conveyor 9 may be relatively short and when at rest or stopped serves as a barrier for the formation of a train or slug 16, comprising a given number of cases 3, on the infeed conveyor 8. The infeed or live roller conveyor 8 must have a length which exceeds the length of a slug 16 of cases 3 formed in closed rank or back-to-back relation thereon.

The discharge portion 6 of conveyor system 1 terminates with a conveyor that presents the cases 3 in orderly fashion for removal by the palletizer 4. The terminal conveyor may be a live roller conveyor 17 generally similar in construction to the infeed conveyor 8. The terminal conveyor 17 has a length that exceeds the length of a train or slug 16 of cases 3 collected in closed rank or back-to-back relation thereon and operates continuously, or at least continuously during periods of operation of the palletizer 4.

The terminal conveyor 17 of the discharge portion 6 is preceded by a second brake belt conveyor 18 of the system 1. The brake belt conveyor 18 is generally similar in construction to the infeed brake belt conveyor 9 except that it has a length that somewhat exceeds the length of a slug 16 of cases 3 arranged in longitudinally spaced relation thereon.

The intermediate travel portion 7 of the conveyor system 1 comprises a plurality of generally identical belt conveyors 19 each of which has a length that somewhat exceeds the length of a slug 16 of cases 3 arranged in longitudinally spaced relation thereon. Structurally the belt conveyors 19 have some similarity to the brake belt conveyors 9 and 18 in that a layer of longitudinally spaced, transversely extending rollers 20 provide support for the upper reach of the continuous belt 21 along with any load carried directly on the belt as generally shown in FIG. 5.

Figure 6:
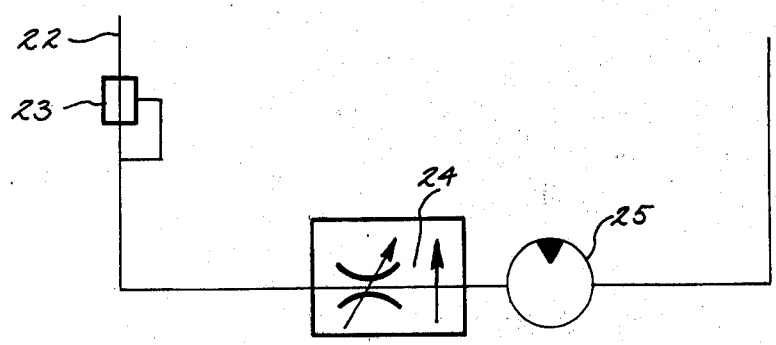
FIG. 6 is an hydraulic diagram showing the hydraulic drive system used to power the intermediate belt conveyors of the conveyor system.

At least in the case of belt conveyors 19 of the intermediate travel portion 7 of the conveyor system 1, the conveyor belts 21 are driven hydraulically. FIG. 6 symbolically shows the hydraulic motor circuit for driving the belt conveyor 19. Line pressure for each belt conveyor 19 may emanate from a common source of hydraulic fluid pressure, not shown, and is conducted through the fluid supply line 22 at each conveyor. Line pressure is reduced to a desired quantum or level by a regulator 23 in the supply line 22 and then passes through pressure compensated flow control valving 24 before entering and driving the hydraulic motor 25 arranged in series with the valving. The hydraulic circuit provides fluid power for driving the motor 25 to develop a torque generally proportional to the momentary demand of the corresponding belt conveyor 19.

As generally shown in FIG. 1, the conveyor system 1 is controlled by a series of four photo relay cells 26, 27, 28 and 29. The photo cells 26 and 29 have built in time delays that normally allow individual cases 3 to pass unrecognized and will deactivate only when they are blocked or see dark for a period longer than the built in time delay. Photo cells 27 and 28, on the other hand, will evidence blockage or see dark to actuate when the first case 3 of a slug 16 passes and have a built in time delay so as not to detect the spacing between the cases. As generally shown in FIG. 1, the photo relay cell 26 is disposed on the infeed portion 5 of the conveyor system 1 adjacent to the live roller conveyor 8 at a location corresponding to the length of a full train or slug 16 from the upstream end of the brake belt conveyor 9. As will be explained more fully hereinafter, the principal function of the photo relay cell 26 is to signal the completion of a newly formed slug 16. The photo relay cell 27 is disposed on the intermediate travel portion 7 of the conveyor system 1 at a location spaced a short distance upstream from the downstream end of the belt conveyor 19 next adjacent to the brake belt conveyor 9. The principal function of photo relay cell 27 is to signal clearance for a newly formed train or slug 16. The photo relay cells 28 and 29 are disposed on the discharge portion 6 of the conveyor system 1. Photo relay cell 28 is disposed at a location spaced a short distance upstream from the downstream end of the brake belt conveyor 18 and photo relay cell 29 is disposed at a location generally less than the length of a slug 16 downstream from the downstream end of the brake belt conveyor 18. The principal function of the photo relay cell 29 is to signal the capability for the terminal conveyor 17 to receive the next following slug 16 in closed rank or back-to-back relation. If the terminal conveyor 17 is not able to receive the next following slug 16, then the photo relay cells 28 and 29 together serve to stop the brake belt conveyor 18 to retain and accumulate that next following slug thereon as will be further described hereinafter.

The mode of operation of the conveyor system 1 will be further described in conjunction with the electrical control circuitry generally shown in FIG. 7 as disposed between the power supply buses 30 and 31. All relay contacts in the circuitry of FIG. 7 are shown in their deenergized state.

In the circuitry of FIG. 7, power is turned on with closure of the on-off selector switch 32 in line L1 to energize the relay coil 33. With energization of the relay coil 33, the corresponding relay contacts 33A in line L2 are closed to provide power to the photo relay cells 26, 27, 28 and 29 in the parallel branch lines L2, L3, L4 and L5, respectively, all in series with the relay contact 33A. Simultaneously, the relay coil 33 will effect closure of the relay contacts 33B in line L7 to render the related control circuits operational.

When the conveyor system 1 is rendered operational, the live roller conveyor 8 of the infeed portion 5, all the belt conveyors 19 of the intermediate portion 7, the brake belt conveyor 18 and live roller conveyor 17 of the discharge portion 6 are all in motion. Only the brake belt conveyor 9 of the infeed portion 5 remains in a motionless state in readiness to accumulate upstream therefrom on the live roller conveyor 8 a slug 16 of cases 3 from the packer 2. The accumulation of a slug 16 of cases 3 on the live roller conveyor 8 is provided for in the circuitry of FIG. 7 because when the photo relay cell 26 is energized the normally closed relay contacts 26A in line L6 are opened providing for the passage of individual spaced cases.

When sufficient cases 3 have been accumulated to form a slug 16 in closed rank or back-to-back relation on the live roller conveyor 8 behind the brake belt conveyor 9, the photo relay cell 26 becomes blocked and sees dark to close the relay contacts 26A and thus energize the relay coil 34 in line L6. With no cases 3 downstream from the brake belt conveyor 9, the photo relay cell 27 remains energized to retain the relay contacts 27A and 27B closed in lines L7 and L8, respectively. The energization of relay coil 34 not only closes the relay contacts 34A in line L7 to lock in the coil, but also closes the relay contacts 34B in line L8. The closure of relay contacts 27B and 34B in line L8 effects an energization of the brake belt conveyor control solenoid valve 35 to place the brake belt conveyor 9 in motion to release or deliver the newly accumulated slug 16 of cases 3. The live roller conveyor 8, which during accumulation of a slug 16 operates at a given lesser speed, is simultaneously speeded up to correspond to the speed of the brake conveyor 9 with energization of the live roller conveyor control solenoid valve 36 in parallel line L9. With the brake belt conveyor 9 and live roller conveyor 8 operating at the same speed, the cases 3 making up the slug 16 remain in closed rank or back-to-back relation as they move across the brake belt conveyor for delivery onto the first of the belt conveyors 19.

The plurality of belt conveyors 19 as well as the brake belt conveyor 18 and the terminal live roller conveyor 17 all operate at substantially the same speed, and that speed is stepped-up or faster than the speed at which the live roller conveyor 8 and brake belt conveyor 9 are delivering the cases 3 of the slug 16. This differential in speed results in the generation of a space or gap 37 of perhaps several inches between the individual cases 3 in the slug 16 on the first belt conveyor 19. Since all of the conveyors downstream from the first belt conveyor 19 operate at substantially the same speed, the space or gap 37 between the cases 3 of a slug 16 is generally maintained until the cases reach and reclose rank on the terminal conveyor 17 before the palletizer 4.

When the first case 3 of a newly released slug 16 reaches and blocks the photo relay cell 27, that cell in effect signals that the first belt conveyor 19 has now received the full slug. With blockage of the photo relay cell 27, the relay contacts 27A and 27B in lines L7 and L8, respectively, reopen and thereby break the locking circuit for the relay coil 34 and effect a deenergization of the solenoid valves 35 and 36 to brake or stop the motion of the brake belt conveyor 9 and return the live roller conveyor 8 to its slower slug accumulation speed. Since the photo relay cell 27 will in effect remain blocked until the last case 3 of the slug 16 has passed it, the corresponding relay contacts 27A and 27B will remain open to preclude the delivery of the next slug by the brake belt conveyor 9.

The photo relay cell 27 is reenergized after a slug 16 has cleared it to reclose the corresponding relay contacts 27A and 27B and thus reset the circuit for delivery of the next slug. When the time required for accumulation of a slug 16 behind the brake belt conveyor 9 generally equals the time it takes a slug to traverse a length of belt conveyor 19, the conveyor system 1 provides that adjacent slugs will be spaced apart approximately the length of a belt conveyor 19. The heavier solid lines in FIG. 2 representing slugs 16, generally show the relative position of slugs and the spacing therebetween on the conveyor system 1 when all elements are functioning properly.

On occasion a bad pallet or a bad case 3 or some other reason will give rise to shut down of the palletizer 4. With palletizer shut-down, cases 3 will accumulate in an upstream direction on the live roller conveyor 17. If such an accumulation backs up to block the photo relay cell 29, it in effect signals that the live roller conveyor 17 is no longer able to receive a full slug 16. A blockage of the photo relay cell 29 effects a deenergization thereof to open the corresponding relay contacts 29A in line L11. That condition alone has no effect in the circuit of FIG. 7, and if the palletizer shut-down problem is instantly cured, the photo relay cell 29 may become unblocked to effect a reclosure of the relay contacts 29A to return the circuitry to a condition of normal operation on the conveyor system 1. However, if the relay contacts 29A in line L11 remain open due to a continuing blockage of the photo relay cell 29, the lead case 3 of an approaching slug 16 on the brake belt conveyor 18 will effect a simultaneous blockage of the photo relay cell 28 and thus also open the relay contacts 28A in line L12 to break the latching circuit for the relay coil 38 in line L11. A deenergization of the relay coil 38 opens the corresponding relay contacts 38A in line L12 of the latching circuit and the relay contacts 38B in line L13 to deenergize the solenoid valve 39 which in effect stops the brake belt conveyor 18 with the approaching slug 16 retained and accumulated thereon. If the palletizer problem is now cured to unblock the photo relay cell 29 and thus reenergize the relay coil 38 in line L11 and thereby reclose relay contacts 38B to reenergize the solenoid valve 39 in line L13 and so restart the brake belt conveyor 18 before the next following slug 16 reaches that brake belt conveyor, the further travel of that next following slug toward the palletizer likely will remain unaffected on account of the problem just cured.

Occasionally the palletizer 4 may be beset with a problem requiring a substantially longer period of shut-down. It is desired, however, that production at the packer 2 continue. To reconcile the problem of palletizer shut-down and the desire for continuing packer production, the conveyor system 1 must be able to accumulate such production during palletizer down-time. If the period of palletizer down-time results in accumulation of cases 3 on the entire conveyor system 1, provision must be made for also stopping the packer 2. If the entire conveyor system 1 is loaded with accumulation, it is desired to resume production at the packer 2 soon after the palletizer problem is cured. Ideally the palletizer 4 is capable of palletizing cases 3 at a rate substantially faster than the production rate of the packer 2 so that any full or partial accumulation on the conveyor system 1 is palletized in the shortest recovery time possible in anticipation of possible future problems at the palletizer 4.

When the palletizer problem results in shut-down of the palletizer 4 for a period requiring accumulation to extend upstream from the brake belt conveyor 18, the latter will have come to rest or be stopped with a slug 16 accumulated thereon as previously described. For efficient accumulation, the next following slug 16 will come to rest on the last belt conveyor 19 which is next adjacent to the brake belt conveyor 18. As the lead case 3 of that next following slug 16 reaches the stopped brake belt conveyor 18, that case is stopped by conveyor 18 imposing a friction force on the belt 21 of the corresponding last belt conveyor 19. This friction force is sensed by the pressure compensated flow control valving 24 in the hydraulic drive system of the corresponding last belt conveyor 19 bringing the conveyor 19 to a stop with the slug 16 thereon. As the belt 21 of the last conveyor 19 coasts to a stop, several cases 3 at the lead end of the slug 16 thereon likely will close ranks upon the stopped lead case 3, but the remainder of the cases of the slug will generally maintain the gaps 37 between the individual cases. Succeeding slugs 16 will similarly come to rest and accumulate on each of the remaining belt conveyors 19 in the upstream direction like a chain reaction if the down-time for the palletizer 4 so requires.

When the palletizer problem is again corrected and the brake belt conveyor 18 resumes operation, the friction force exerted by the lead case 3 on the belt 21 of the last belt conveyor 19 adjacent to the brake belt conveyor 18 is removed. The removal of the friction force is sensed by the pressure compensated flow control valving 24 in the corresponding hydraulic drive system so that the hydraulic motor 25 again actuates the corresponding belt 21 and sends the slug 16 accumulated thereon on its way. Again like a chain reaction the hydraulic motors 25 for succeeding belt conveyors 19 in the upstream direction resume actuation of their respective belts 21 to get the corresponding slugs 16 underway over the balance of conveyor system 1.

If palletizer shut-down requires accumulation of slugs 16 to extend upstream to the first belt conveyor 19 adjacent to the brake belt conveyor 9, the corresponding photo relay cell 27 will of course be blocked to preclude delivery of still another newly formed slug 16 by the brake belt conveyor 9 as earlier described herein. When the accumulation further extends to an undelivered slug 16 formed upstream from the brake belt conveyor 9 on the live roller conveyor 8, the corresponding photo relay cell 26 will also become blocked to open the relay contacts 26B in line L10 to thereby energize the time delay relay 40 having corresponding relay contacts 40A in the electrical control circuitry 41 of the packer 2. The relay 40 is time delayed to prevent closure of the relay contacts 40A during normal formation and delivery of a slug 16 by the brake belt conveyor 9. Extended blockage of photo relay cell 26 as results when accumulation on the conveyor system 1 extends upstream to include a full slug 16 on the live roller conveyor 8, then the relay contacts 40A close to effect a shut-down of the packer 2 and so preclude the addition of further production on the conveyor system.

After the problem at the palletizer 4 has been corrected and the slug 16 of cases 3 on the first belt conveyor 19 adjacent to the brake belt conveyor 9 has moved on to the next belt conveyor 19 to unblock the photo relay cell 27 and thereby has provided for delivery of the waiting last formed slug on the live roller conveyor 8 to unblock the photo relay cell 26, then the contacts 26B in line L10 will reopen to deenergize the time delay relay 40 and thereby reopen the relay contacts 40A in the control circuitry 41 of the packer 2 so that packer production may again be resumed.

Aside from providing for maximum accumulation for periods of palletizer down-time and relatively rapid recovery from such accumulation after palletizer operation is resumed, the conveyor system 1 provides for soft handling of the cases 3 since they largely ride on belts with a minimum of contact and pressure therebetween. As a result, higher conveyance speeds are possible. The rather substantial reliance on belt conveyors in the conveyor system 1 also generally provides for lower initial cost, longer life expectancy, a cleaner and quieter working environment, and lower maintenance cost.

Various modes of carrying out the invention are contemplated as being within the scope of the following claims particularly pointing out and distinctly claiming the subject matter which is regarded as the invention.

I claim:

1. In a conveyor system for transporting articles in trains or slugs between spaced upstream and downstream stations, said system comprising an infeed portion at the upstream station and a discharge portion at the downstream station and an intervening portion between the infeed and discharge portions, drive means for the intervening portion of the conveyor system, a first brake belt conveyor at the downstream end of the infeed portion, means to drive and stop the first brake belt conveyor to provide for the accumulation of a slug on the infeed portion and the subsequent delivery of the newly formed slug from the infeed portion to the intervening portion of the conveyor system, first means upstream from the first brake belt conveyor to signal the accumulation of a full slug on the infeed portion, and second means downstream from the first brake belt conveyor to signal the capability of the intervening portion for receiving a newly formed slug, said first and second signal means together serving to control the operation of the first brake belt conveyor, said discharge portion of the conveyor system comprising a terminal conveyor and a second brake belt conveyor upstream from the terminal conveyor, said second brake belt conveyor having a length somewhat exceeding the length of a slug of the articles, means to drive and stop the second brake belt conveyor, third means to signal the capability of the terminal conveyor to receive the next following slug, and fourth means to signal the arrival of said next following slug on the second brake belt conveyor, said third and fourth signal means together serving to control the operation of the second brake belt conveyor and effecting a stoppage thereof for accumulation thereon of said next following slug when the terminal conveyor is not able to receive said next following slug.

2. The structure as set forth in claim 1 wherein the terminal conveyor is a live roller conveyor having a length exceeding that of a slug of the articles.

3. The structure as set forth in claim 1 wherein the intervening portion of the conveyor system comprises at least one belt conveyor having a length somewhat exceeding the length of a slug of the articles, an hydraulic motor to drive said belt conveyor, pressure compensated flow control valving for controlling said hydraulic motor to provide for automatic stoppage of the belt conveyor to accumulate a slug thereon after the second brake belt conveyor is stopped and automatic resumption of motion to dispatch the slug thereon after the second brake belt conveyor is placed in motion.

4. The structure as set forth in claim 1 wherein the intervening portion of the conveyor system comprises a plurality of belt conveyors, each of said belt conveyors have a length somewhat exceeding the length of a slug of the articles, an hydraulic motor to drive each of said belt conveyors, pressure compensated flow control valving for controlling said hydraulic motors to provide for serially and automatically stopping said belt conveyors to accumulate a slug on each belt conveyor after the second brake belt conveyor is stopped and serially and automatically resuming motion to dispatch their respective slugs after the second brake belt conveyor is placed in motion.

5. The structure as set forth in claim 4 wherein the second means downstream from the first brake belt conveyor to signal the capability of the intervening portion for receiving a newly formed slug is disposed to indicate the capability of the farthest upstream hydraulically driven belt conveyor.

6. The structure as set forth in claim 5 wherein a first production machine is disposed at the upstream station and places the articles on the infeed portion of the conveyor system and a second production machine is disposed at the downstream station for removal of the articles from the discharge portion of the conveyor system, said second production machine being capable of a higher rate of production than normally required by the production rate of the first production machine to provide for the removal of articles at the higher rate of production and recovery from any accumulation on the conveyor system even while the first production machine is adding articles to the system at its normal rate of production.

7. The structure as set forth in claim 5 wherein a packing machine is disposed at the upstream station and a palletizing machine is disposed at the downstream station.

8. The structure as set forth in claim 7 wherein the palletizing machine is capable of a higher rate of production than normally required by the production rate of the packing machine to provide for the removal of articles at the higher rate of production and recovery from any accumulation on the conveyor system even while the packing machine is adding articles to the system at its normal rate of production.

9. The structure as set forth in claim 5 wherein a production machine is disposed at the upstream station and places the articles on the infeed portion of the conveyor system for accumulation upstream from the first brake belt conveyor, and means to drive and stop the production machine, said first signal means upstream from the first brake belt conveyor serving to control the stop-go operation of said production machine and effecting a shut down of the machine when said first signal means signals the formation of a newly formed slug on the infeed portion and the second signal means disposed to indicate the capability of the farthest upstream hydraulically driven belt conveyor signals an inability to receive a newly formed slug by reason of maximum accumulation all the way downstream from the first brake belt conveyor.

10. In a conveyor system for transporting articles in trains or slugs, at least a pair of belt conveyors arranged in upstream and downstream serial relation with at least the upstream belt conveyor having a length somewhat exceeding the length of a slug of the articles, means to drive and stop the belt of the downstream conveyor, an hydraulic motor to drive the belt of the upstream conveyor, a source of fluid pressure, means to conduct fluid pressure from said source to said motor, pressure compensated flow control valving in said conducting means between said source and the motor and providing for a torque to drive the corresponding belt generally proportional to the momentary demand on said corresponding belt, said valving responding to a friction force imposed upon the corresponding belt to automatically stop the upstream conveyor and effect accumulation of a slug thereon when the lead article of the slug thereon reaches and is stopped by the stopped belt of the downstream conveyor, said valving further responding and automatically placing the corresponding belt of the upstream conveyor back in motion to dispatch the slug thereon when the friction force is removed upon start up of the belt of the downstream conveyor.

11. The structure as set forth in claim 10 wherein a plurality of hydraulically driven belt conveyors are arranged serially upstream from the downstream belt conveyor, each of said hydraulically driven belt conveyors having a length somewhat exceeding the length of a slug of the articles and being driven by an hydraulic motor controlled by pressure compensated flow control valving, said hydraulically driven belt conveyors being adapted to serially and automatically stop to accumulate a slug on each conveyor when the downstream belt conveyor is stopped and being adapted to serially and automatically resume motion to dispatch their respective slugs when the downstream belt conveyor is placed in motion.

* * * * *